(12) United States Patent
Zarei (10) Patent No.: US 9,077,573 B2
(45) Date of Patent: Jul. 7, 2015

(54) VERY COMPACT/LINEAR SOFTWARE DEFINED TRANSMITTER WITH DIGITAL MODULATOR

(71) Applicant: Marvell World Trade Ltd., St. Michael (BB)

(72) Inventor: Hossein Zarei, Irvine, CA (US)

(73) Assignee: Marvell World Trade Ltd., St. Michael (BB)

( * ) Notice: Subject to any disclaimer, the term of this patent is extended or adjusted under 35 U.S.C. 154(b) by 11 days.

(21) Appl. No.: 13/855,646

(22) Filed: Apr. 2, 2013

(65) Prior Publication Data

US 2013/0259158 A1    Oct. 3, 2013

Related U.S. Application Data

(60) Provisional application No. 61/619,222, filed on Apr. 2, 2012.

(51) Int. Cl.
*H04L 27/00* (2006.01)
*H04L 25/03* (2006.01)
*H04L 7/00* (2006.01)
*H04L 7/033* (2006.01)

(52) U.S. Cl.
CPC ...... *H04L 25/03* (2013.01); *H04L 7/00* (2013.01); *H04L 7/0091* (2013.01); *H04L 7/033* (2013.01)

(58) Field of Classification Search
CPC ..... H04L 25/03; H04L 7/0091; H04L 1/0003; H04L 1/0071; H04L 5/0007; H04L 1/0009; H04L 27/0008

USPC ............... 375/295, 316, 219, 297, 296
See application file for complete search history.

(56) References Cited

U.S. PATENT DOCUMENTS

| | | | |
|---|---|---|---|
| 6,339,391 B1 * | 1/2002 | Chung et al. .................. 341/153 |
| 2005/0074073 A1 | 4/2005 | Yuan et al. | |
| 2006/0291589 A1 | 12/2006 | Eliezer et al. | |
| 2008/0240284 A1 | 10/2008 | Chow | |
| 2010/0124290 A1 * | 5/2010 | Kablotsky ..................... 375/259 |
| 2010/0135368 A1 * | 6/2010 | Mehta et al. .................. 375/219 |
| 2011/0080984 A1 | 4/2011 | Hyoung | |
| 2011/0169675 A1 * | 7/2011 | Kanayama .................... 341/143 |

FOREIGN PATENT DOCUMENTS

KR    10-2002-0066736 A    8/2002

OTHER PUBLICATIONS

AKihiko Matsuoka, WO2012032746, Multimode Transmitter Apparatus, Mar. 15, 2012, WIPO.*
International Search Report and Written Opinion for PCT/US2013/035030, filed Apr. 2, 2013.

* cited by examiner

*Primary Examiner* — Zewdu Kassa (57) ABSTRACT

A transmitter includes: a digital modulator configured to modulate a base-band signal in a digital domain into a modulated signal; a synchronization module configured to synchronize the modulated signal with a clock signal; and an analog output stage configured to convert the modulated signal into an analog signal for transmission.

18 Claims, 10 Drawing Sheets

VERY COMPACT/LINEAR SOFTWARE DEFINED TRANSMITTER WITH DIGITAL MODULATOR

CROSS REFERENCE TO RELATED APPLICATIONS

This application claims the benefit of and priority to U.S. Provisional Application 61/619,222, filed 2 Apr. 2012.

U.S. Provisional Application 61/619,222 is hereby fully incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In wireless communication technology, transceiver circuits are used in various applications such, for example, cellular telephones, cordless telephones, pagers, global positioning systems, and other applications. A conventional transceiver chip typically includes a transmitter and receiver for performing the wireless communication function. One example of such a transmitter is the conventional Direct-Conversion Radio-Frequency (RF) transmitter which is used for multi-mode transmission with different modulation schemes.

Various components in a conventional Direct-Conversion Radio-Frequency (RF) transmitter introduce a linearity issue that can add noise (or otherwise degrade) the transmitter output signal. For example, a voltage to current conversion stage (commonly identified as a Gm stage) in a conventional Direct-Conversion RF transmitter typically introduces non-linear components to the transmitter output signal when the Gm stage performs a voltage to current conversion of signals prior to the transmission of the transmitter output signal. The non-linear components can introduce undesired frequency tones which degrade the wireless transmission process because these undesired frequency tones can lead to, for example, noise or other interference that affects the transmitted signal in the receiver side.

Additionally, in versions of a conventional Direct-Conversion RF transmitter that does not use the Gm stage, the analog mixer in the conventional transmitter also presents a linearity issue because the voltage signal that is subject to the switching function of the analog mixer typically also introduces non-linear components to the transmitter output signal. The analog local oscillator (LO) can also introduce non-linear components to the transmitter output signal.

Additionally, the analog base-band filter and analog base-band Gm can introduce noise in a receiver frequency band (RX-band noise). This_Rx band noise may negatively affect the receiver in remote devices and/or may negatively affect the receiver in the same device if the device is based on the FDD (frequency-division duplex) standard that requires the transmitter and receiver are on at all times.

FIGURES

Non-limiting and non-exhaustive embodiments of the present disclosure are described with reference to the following figures.

SUMMARY

In an embodiment of the disclosure, a transmitter is provided. The transmitter includes a digital modulator configured to modulate a base-band signal in a digital domain into a modulated signal. A synchronization module is configured to synchronize the modulated signal with a clock signal. An analog output stage is configured to convert the modulated signal into an analog signal for transmission. In an implementation, the synchronization block is connected to the digital modulator, and the analog output stage is connected to the synchronization block.

In another embodiment of the disclosure, a method of generating a radio transmitter output signal is provided. The method includes modulating a base-band signal in a digital domain. The modulated signal is synchronized with a clock signal. The modulated signal is converted into an analog signal for transmission. In an implementation, the modulating is performed by a digital modulator, the synchronizing is performed by a synchronization module (synchronization block) connected to the digital modulator, and the converting is performed by an analog output stage connected to the synchronization block. In another embodiment of the disclosure, a transmitter includes a digital modulator for modulating a base-band signal with a local oscillator signal (clock signal). The modulation is performed in the digital domain. The transmitter also includes a synchronization module (synchronization block) that is connected to the digital modulator. The synchronization block aligns modulated signal from the digital modulator and removes any glitches that may be generated by the delay of the digital modulator. The transmitter also includes an analog output stage connected to the synchronization block. The analog output stage generates an output signal based on the I-data and the Q-data (of the modulated signal) being used as control signals.

DETAILED DESCRIPTION

Reference will now be made in detail to embodiment(s) of the disclosure, an example(s) of which is (are) illustrated in the accompanying drawings. Wherever possible, the same reference numbers will be used throughout the drawings to refer to the same or like parts.

In the following detailed description, for purposes of explanation, numerous specific details are set forth to provide a thorough understanding of the various embodiments of the disclosure. Those of ordinary skill in the art will realize that these various embodiments of the disclosure are illustrative only and are not intended to be limiting in any way. Other embodiments of the disclosure will readily suggest themselves to such skilled persons having the benefit of this disclosure.

Figure 1:
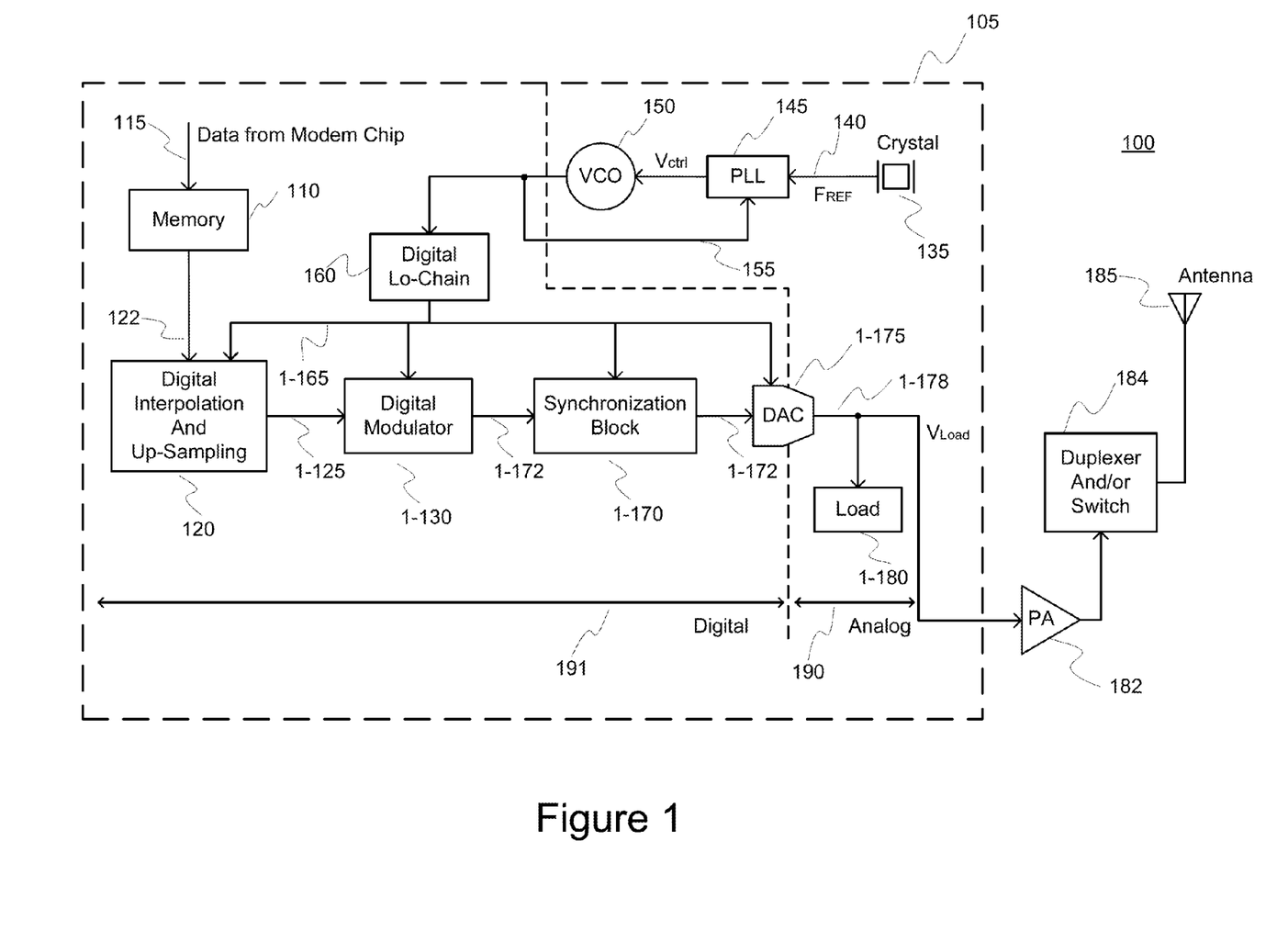
FIG. 1 is a block diagram of a Radio-Frequency (RF) transmitter, in accordance with an embodiment of the disclosure.

FIG. 1 is a block diagram of a Radio-Frequency (RF) transmitter 100, in accordance with an embodiment of the disclosure. A transceiver chip 105 is shown as included in the transmitter 100.

The RF transmitter 100 includes the various components that will now be described. A memory 110 receives data 115 that is serially transmitted from, for example, a modem chip. A digital base-band (BB) interpolation and up-sampling block 120 performs a data sampling of the data 122 in the memory 110 and generates a base-band signal 1-125 based on the sampling clock 1-165 that comes from a digital LO chain 160. The block 120 can include a digital filter to provide some filtering to the undesired images of the base-band data (or base-band signal) 1-125 before the BB signal 1-125 is transmitted to a digital modulator 1-130. These undesired images occur around the multiple values of the sampling clock frequency. This is, for example, to assist in meeting the requirement defined by a standard specification for an output image that falls around the transmitter desired frequency range (for example, from approximately 10 MHz offset to approximately 1 GHz offset).

The block 120 transmits the baseband data 1-125 to the digital modulator 1-130. The operation of the digital modulator 1-130 will be described in further detail below.

A crystal 135 generates the reference clock signal 140 with a reference frequency $F_{REF}$. A phase locked loop (PLL) 145 generates a control voltage $V_{ctrl}$ to a voltage controlled oscillator (VCO) 150. The PLL 145 generates the control voltage $V_{ctrl}$ based on the reference clock signal 140 and the VCO output 155 from the VCO 150. This VCO output 155 is also transmitted to a digital local oscillator (LO) chain 160 (LO-chain 160). The LO chain 160 scales the VCO output 155 to different voltage output values, for example, by some voltage buffers. The LO chain 160 may also scale the frequency of VCO output 155 to a different frequency value(s), for example, by frequency dividers and/or frequency multipliers. The LO chain 160 transmits the LO data 1-165 to the digital interpolation and up-sampling block 120, digital modulator 1-130, a synchronization block 1-170, and an output analog stage 1-175.

The output analog stage 1-175 is typically a digital-to-analog converter (DAC). For convenience purposes, the output analog stage 1-175 will be referred to as the DAC 1-175.

The digital modulator 1-130 digitally mixes or digitally modulates the BB data 1-125 with the LO signal 1-165. The synchronization block 1-170 aligns the output 1-172 from digital modulator 1-130 with the LO signal 1-165. This synchronization or alignment is typically performed on the modulated data 1-172 because of the circuit delay presented by the digital modulator 1-130, as will be discussed below further with reference to FIG. 4. A misalignment between the BB data 1-125 and LO signal 1-165 will typically cause the transitions between the BB data 1-125 and LO signal 1-165 to not be aligned and can result in glitches (e.g., spurious transitions) in the digital modulated signal 1-172.

By way of example, if the base-band signal 1-125 has spectrum from approximately 0 to 9 MHz (a base-band signal usually starts from approximately 0) and the frequency of LO-signal 1-165 is approximately 1 GHz, then the frequency spectrum of the signal 1-172 (which is a modulated signal) can be from about 991 MHz (1 GHz–9 MHz) to about 1.009 GHz (1 GHz+9 MHz). After the digital modulated signal 1-172 transmits through the block 1-170, the digital modulated signal 1-172 transmits to the DAC 1-175. The DAC 1-175 receives the digital modulated signal 1-172 and converts this digital modulated signal 1-172 into the analog output current 1-178.

A load stage 1-180 is connected to the output of the DAC 1-175. Based on the analog output current 1-178, a load voltage signal (Vload) is generated across the load stage 1-180.

A power amplifier (PA) 182 amplifies the load voltage signal (Vload) to a required specification. An output stage 184 and an antenna 185 then transmit the load voltage signal Vload. The output stage 184 can include a duplexer, filter, and/or switch. The power amplifier 182, output stage 184, and antenna 185 are typically not integrated inside the transceiver chip 105. However, in another embodiment of the transmitter 100, at least one of the power amplifier 182, and/or output stage 184 are integrated inside the transceiver chip 100.

In the transmitter 100, the DAC 1-175 and load stage 1-180 are analog components that operate in the analog domain 190. The memory 110, block 120, digital modulator 1-130, digital LO-chain 160, and synchronization block 1-170 are digital components and operate in the digital domain 191.

An advantage of this architecture of the transmitter 100 is the current/power savings and area savings provided by the above digital circuits. Additionally, as processing technology is continuing to allow the sizes of digital components to decrease to smaller geometry and areas, the area savings that are provided by the digital modulator 1-130 and/or synchronization block 1-170 is an advantage of the transmitter 100. For example, the transmitter 100 can be a very compact transmitter for scaled CMOS process geometry and for future <45 nm process. Furthermore, since the transmitter 100 includes the digital modulator 1-130 and digital synchronization block 1-170, the transmitter 100 can also be software defined.

Additionally, since the transmitter 100 does not use the analog components of a Gm stage, an analog LO-chain, an analog mixer, the transmitter 100 has an advantage of substantially avoiding the non-linearity problems related to these analog components.

Since the transmitter 100 does not use an analog base-band filter and analog base-band Gm, the receive (Rx) band noise is reduced. This Rx band noise may negatively affect the receiver in remote devices and/or may negatively affect the receiver in the same device if the device is based on the FDD standard that requires the transmitter and receiver are on at all times.

Figure 2:
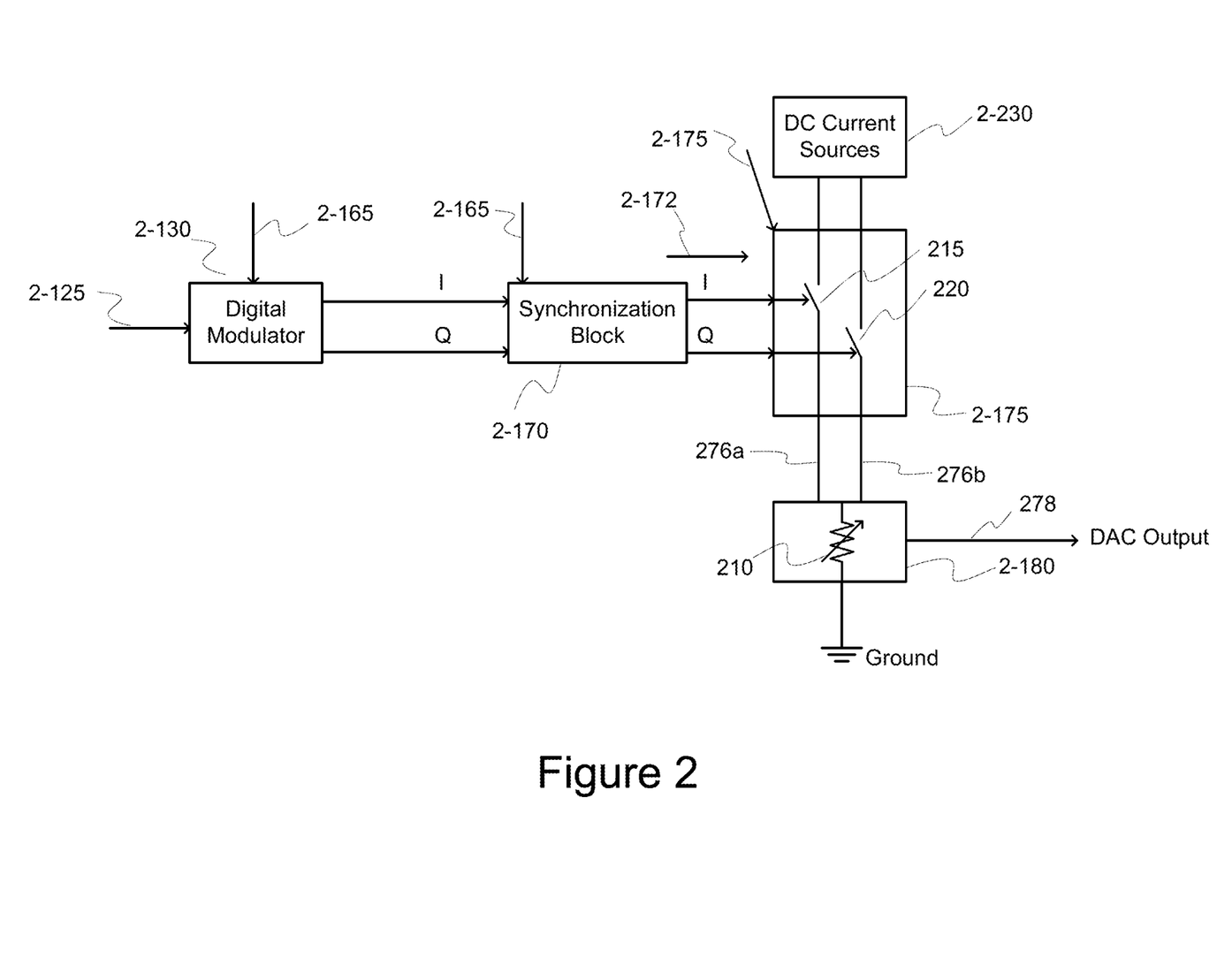
FIG. 2 is a block diagram that shows additional details of the digital modulator, synchronization module (synchronization block), DAC, and load of a transmitter, in accordance with an embodiment of the disclosure.
Figure 3:
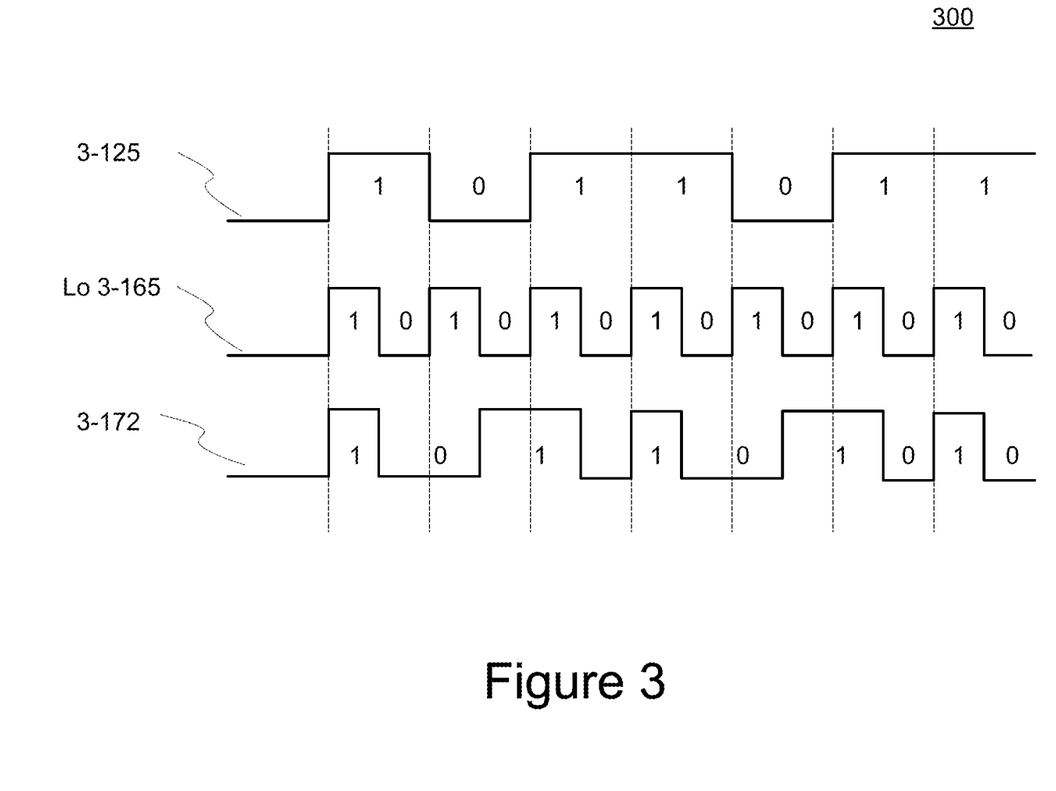
FIG. 3 illustrates timing diagrams of the signals transmitting through the modulator and/or synchronization block, in accordance with an embodiment of the invention.

FIG. 2 is a block diagram that shows additional details of the digital modulator 2-130, synchronization block (module) 2-170, DAC 2-175, and load 2-180 of the transmitter 100, in accordance with an embodiment of the disclosure. FIG. 3 illustrates timing diagrams of the signals transmitting through the modulator 2-130 and synchronization block 2-170, in accordance with an embodiment of the invention. The In-phase data (I-data) and Quadrature data (Q-data) quadrature modulation techniques are used to enable two independent signals to be combined at a transmitter, transmitted on the same transmission band, and separated at a receiver. The principle of quadrature modulation is that two separate signals, I-data and Q-data, are modulated by using the same carrier wave frequency, but the carrier wave of the Q-data is ninety degrees out of phase with the carrier wave of the I-data. The quadrature modulated signals can be summed before transmission to the receiver.

The digital modulator 2-130 generates the I-data and Q-data in the digital domain instead of the analog domain. The DAC 2-175 converts the I-data and Q-data into a current by selecting a specific number of current sources (in DC current sources stage 2-230). The DAC 2-175 is operating at a maximum rate which is the same as the RF channel frequency ($F_{RF}$). The frequency spectrum of the baseband signal 2-125 is, for example, approximately 0 to 9 megahertz. The frequency of the I-data and Q-data 2-172 is, for example, approximately 2 gigahertz.

The switches 215 and 220 will connect the DC current sources 2-230 to the load stage 2-180, respectively. The switches 215 and 220 are on when the I-data and Q-data are 1, respectively. When the switches 215 and/or 220 are on, the current from the stage 2-230 will result in a voltage across the load 2-180. Therefore, the modulated data 2-172 will depend on the transitions in the baseband data 2-125.

The transmitter topology shown in FIG. 2 is an example of a software defined radio transmitter architecture, since most of the functionalities of the transmitter 100 (FIG. 1) is performed in the digital domain.

The analog gain-control (AGC) can be performed by changing the current values of the DC-current sources 2-230 and/or adjusting the values of a variable load resistor 210 of the load 2-180, among other techniques. The load 2-180 can include a balun transformer to convert the output differential signal 276a and 276b (FIG. 2) to a single DAC output 278 (FIG. 2).

The range of analog digital gain-control (AGC) can be large in the transmitter 100 (FIG. 1) due to the lower LO-leakage in the transmitter 100, since the signal (2-172) (applied to switches 215 and 220 in FIG. 2) is a modulated signal and not a periodic signal. Also digital gain-control (DGC) can be applied before or after digital modulator 2-130 to increase the gain-control range.

FIG. 3 illustrates timing diagrams of the signals transmitted through the modulator 2-130 and the synchronization block 2-170 (FIG. 2). The waveform of the modulated signal 3-172 is generated by performing an XNOR logic operation on the waveforms of the BB signal 3-125 and LO signal 3-165. The details of the modulation performed by the modulator 2-130 (FIG. 2) are discussed below with reference to FIG. 4.

Figure 4:
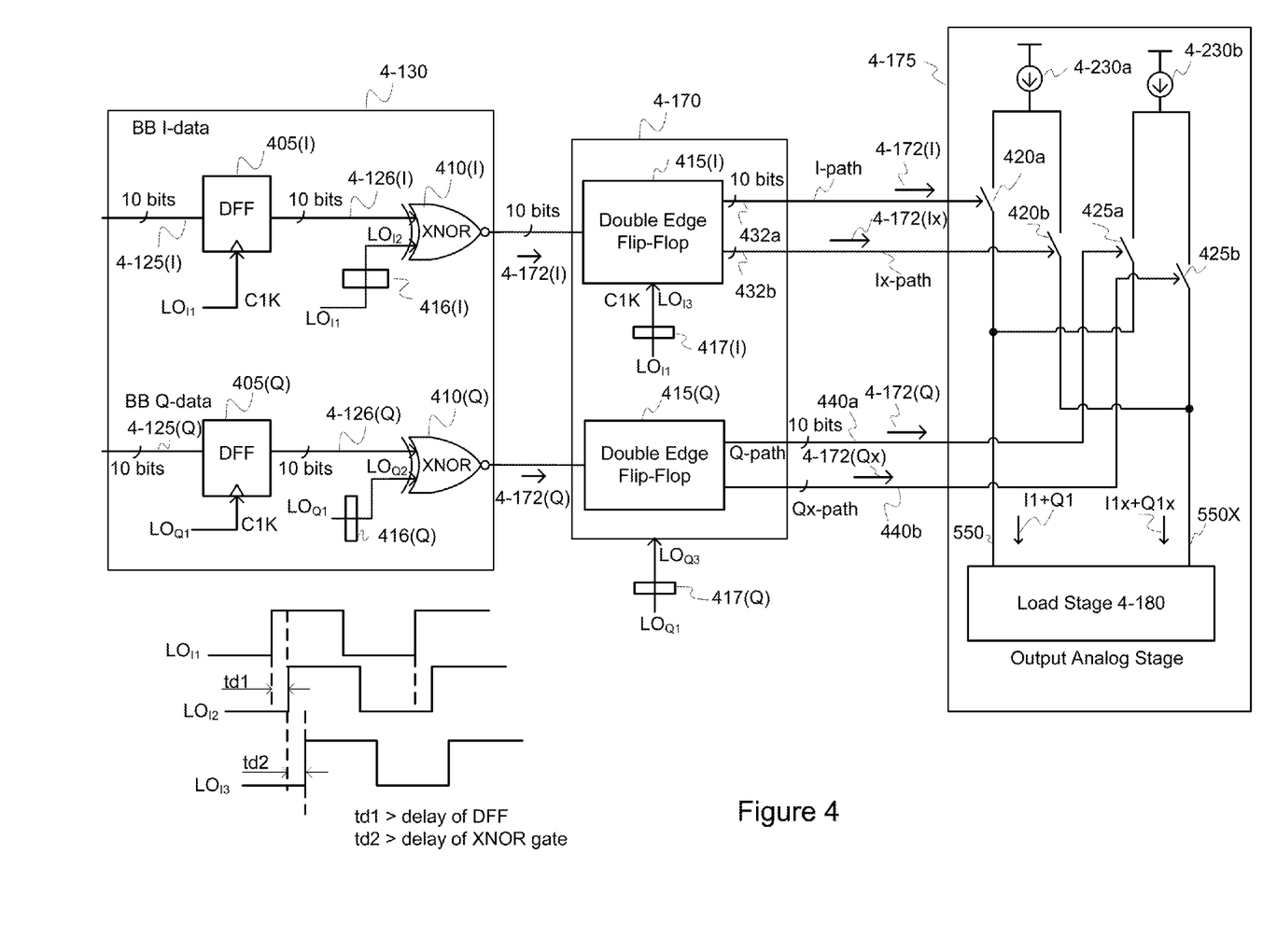
FIG. 4 is a block diagram that shows an example with additional details of the digital modulator, synchronization block, and DAC, in accordance with an embodiment of the disclosure.

FIG. 4 is a block diagram that shows additional details of the digital modulator 4-130, synchronization block 4-170, and DAC 4-175, in accordance with an embodiment of the disclosure. In FIG. 1, the base-band signal 1-125 is illustrated as one bit. In FIG. 4, each of the base-band signal I-data 4-125(I) and the base-band signal Q-data 4-125(Q) are described as 10 bits each. However, I-data 4-125(I) and Q data 4-125(Q) may be at other bit values. The number of bits should be calculated by the desired transmitter performance as explained later.

Each bit of the I-data 4-125(I) is received by a DFF 405(I). Each DFF 405(I) receives a LO signal LOI1 (non-delayed LO I-data clock signal) from the digital LO chain 160 (FIG. 1). When I-data 4-125(I) is 10 bits, then these 10 bits will be received by ten DFFs in the stage 405(I). Each of the ten DFFs receives the LO signal LOI1. The LOI1 clock signal is the timing signal for the DFF 405(I), while the LOQ1 clock signal is the timing signal for the DFF 405(Q).

The DFF 405(I) will synchronize the BB I-data 4-125(I) by use of the clock signals which are the LOI1 to generate 4-126(I), a delayed version of 4-125(I) by the delay of DFF 405(I). The DFF 405(I) and DFF 405(Q) receives the LO signal LOI1 and LO signal LOQ1, respectively, from the LO chain 160 (FIG. 1). Each bit of the Q-data 4-125(Q) is received by a DFF 405(Q). Each DFF 405(Q) receives a LO signal LOQ1 from the digital LO chain 160 and generates 4-126(Q), a delay version of 4-125(Q). When the Q-data 4-125(Q) is 10 bits, then these 10 bits will be received by ten DFFs in the stage 405(Q). Each of the ten DFFs receives the LO signal LOQ1.

For illustrative convenience, only the DFF 405(I) will be described with respect to FIG. 4. The XNOR gate 410(I) and the XNOR gate 410(Q) are connected to the DFF 405(I) and the DFF 405(Q), respectively. The XNOR gate 410(I) performs the modulation of the BB I-data 4-126(I) with LOI2 (from LO-chain 160) to generate the modulated signal 4-172(I) based on the XNOR function. The LOI2 is a first delayed I-data clock signal as will be explained below.

The generation of the BB modulated signal 4-172(I) is described below in Table 1. When a bit of the I-data 4-126(I) is 0, the XNOR gate 410(I) will invert LOI2 value and generate this inverted LOI2 value as output of the XNOR gate 410(I). When a bit of the I-data 4-126(I) is 1, the XNOR gate 410(I) will not invert LOI2 value and generate the LOI2 value as output of the XNOR gate 410(I).

Table 1 below shows the various values of a bit of the I-data 4-126(I) and a bit of the LO signal LOI2, and a bit of the digitally modulated signal 4-172(I) that is generated by the XNOR gate 410(I).

TABLE 1

| BB I-data 4-126(I) bit | LOI2 bit | Modulated I-data signal 4-172(I) |
|---|---|---|
| 0 | 0 | 1 |
| 0 | 1 | 0 |
| 1 | 0 | 0 |
| 1 | 1 | 1 |

The same XNOR function in Table 1 will apply to the input BB Q-data 4-126(Q) and LO signal LOQ2 and modulated signal 4-172(Q).

The synchronization block 4-170 has a double-edge flip-flop 415(I) connected to the output of the XNOR gate 410(I), and a double-edge flip-flop 415(Q) connected to the output of the XNOR gate 410(Q). The flip-flops 415(I) and 415(Q) receive the clock signals LOI3 and LOQ3, respectively, from the digital LO chain 160. The LOI3 is a second delayed LO I-data clock signal, and the LOQ3 is a second delayed LO Q-data clock signal, as will be explained below. Each of the double-edge flip-flops 415(I) and 415(Q) operates on both rising edge and falling edge of the clock signals LOI3 and LOQ3, respectively.

Figure 5:
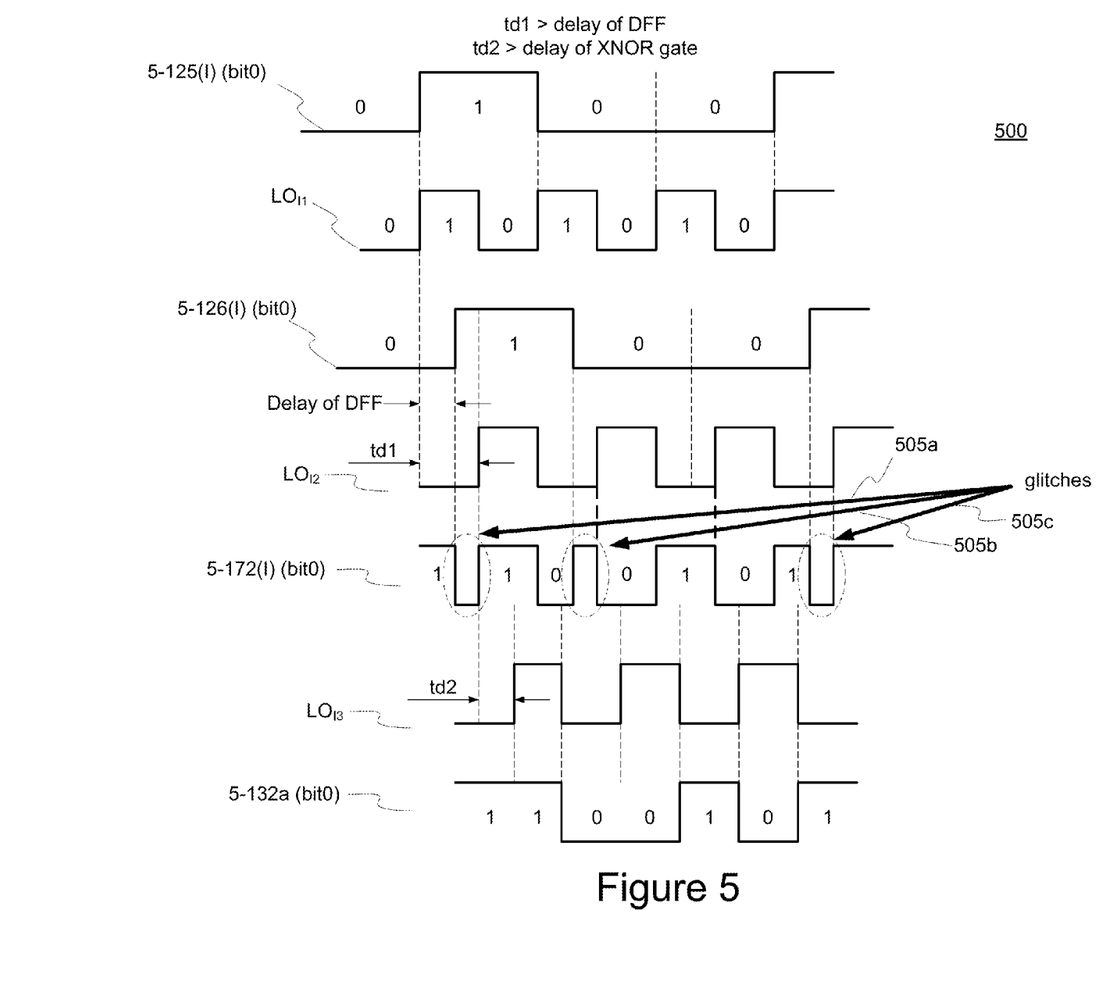
FIG. 5 illustrates timing diagrams of the signals transmitting through the modulator and/or synchronization block, in accordance with an embodiment of the invention.

As shown in FIG. 4, the clock signal LOI2 is a delayed version of LOI1, by a time value td1 which is greater than the time delay presented by the DFF 405(I) to the I-data 4-125(I). The XNOR gate 410(I) receives the clock signal LOI2 and the delayed I-data 4-126(I) to perform an XNOR operation. Therefore, the clock signal LOI2 (a delayed version of LOI1 by time td1) is used in order to compensate a misalignment between the clock signal LOI1 and the delayed I-data 4-126 (I) so that the XNOR operation is performed on the delayed I-data 4-126(I). Due to the delay between two input data to XNOR (4-126(I) and LOI2), some glitches may occur (e.g., glitches 505*a*, 505*b*, and 505*c* can be generated as shown in FIG. 5). These glitches are removed by the synchronization block 4-170, as explained further below in connection with FIG. 5.

The clock signal LOI3 is a delayed version of LOI1, by a time value (td1+td2) where td2 is greater than the time delay presented by the XNOR gate 410(I). The Flip-Flop 415(I) receives the clock signal LOI3 and XNOR output 4-172 (I) to remove the glitches created at XNOR output. Therefore, the clock signal LOI3 (a delayed version of LOI1) is used in order to remove glitches created by XNOR due to misalignment at XNOR inputs between 4-126(I) and LOI2.

The delay stage 416(I) provides the time delay td1 to the clock signal LOI1 to generate the clock signal LOI2. The delay stage 417(I) provides the time delay (td1+td2) to the clock signal LOI1 to generate the clock signal LOI3.

The delay stage 416(Q) provides the time delay td1 to the clock signal LOQ1 to generate the clock signal LOQ2. The delay stage 417(Q) provides the time delay (td1+td2) to the clock signal LOQ1 to generate the clock signal LOQ3.

The delay stages 416(I), 416(Q), 417(I) and 417(Q) can be, for example, buffers. The delay stages 416 and 417 can be internal or external to the LO-Chain 160 (FIG. 1).

The DAC 4-175 have four set of switches 420*a*, 420*b*, 425*a*, and 425*b* which are cross-coupled. The current sources 4-230*a* and 4-230*b* are external to the DAC 4-175 or integrated in the DAC 4-175. The current source 4-230*a* is connected to the switches 420*a* and 420*b*. The current source 4-230*b* is connected to the switches 425*a* and 425*b*. The switches 420*a*, 420*b*, 425*a*, and 425*b* are also connected to the load 4-180.

The I-path 432*a* and Ix-path 432*b* (from the double-edge flip-flop 415(I)) are connected to the switches 420*a* and 420*b*, respectively. The I-path 432*a* transmits the I-path signal (I) from the double-edge flip-flop 415(I) to the switch 420*a* as a control signal for controlling the switch 420*a*. The I-path 432*b* transmits the Ix-path signal (Ix) from double-edge flip-flop 415(I) to the switch 420*b* as a control signal for controlling the switch 420*b*. The signal (Ix) is an inverted value of the signal (I). The output of XNOR gate can also include differential signal 4-172(I) and 4-172(Ix) and 4-172(Q) and 4-172(Qx), where 4-172(Ix) is inverted version of the signal 4-172(I) and 4-172(Qx) is inverted version of the signal 4-172(Q).

The Q-path output 440*a* and Qx-path 440*b* (from the double-edge flip-flop 415(Q)) are connected to the switches 425*a* and 425*b*, respectively. The Q-path 440*a* transmits the signal (Q) from double-edge flip-fop 415(Q) to the switch 425*a* as a control signal for controlling the switch 425*a*. The Q-path 440*b* transmits the signal (Qx) from double-edge flip-flop 415(Q) to the switch 425*b* as a control signal for controlling the switch 425*b*. The signal (Qx) is an inverted value of the signal (Q).

The switches 420*a* and 425*a* transmit the current value (I1+Q1) to the load stage 4-180. The switches 420*b* and 425*b* transmit the current value (I1x+Q1x) to the load stage 4-180.

FIG. 5 illustrates timing diagrams of the signals transmitted through the modulator 4-130 (FIG. 4) and synchronization block 4-170. The I-data 5-125(I) is converted by the DFF 405(I) (FIG. 4) into the delayed I-data 5-126(I). Subsequently, an XNOR operation is performed on the delayed I-data 5-126(I) and the clock signal LOI2. Since the clock signal LOI2 has been delayed by a time interval td1 which is greater than the time delay presented by the DFF 405(I) to the I-data 4-125(I), the XNOR output 5-172(I) has glitches 505*a*, 505*b*, and 505*c*. These glitches 505*a* and 505*b* can be removed by using the double-edge flip flop 415(I) having the clock signal LOI3 as another input signal. The clock signal LO3 has been delayed by a time interval (td1+td2) where td2 is greater than the time delay presented by the XNOR gate 410(I). By detecting values of the XNOR output 5-172(I) corresponding to both rising and falling edges of the clock signal LOI3, the output signal 5-132*a* from the double-edge flip flop has a waveform that does not have the glitches 505*a* and 505*b*.

Figure 6:
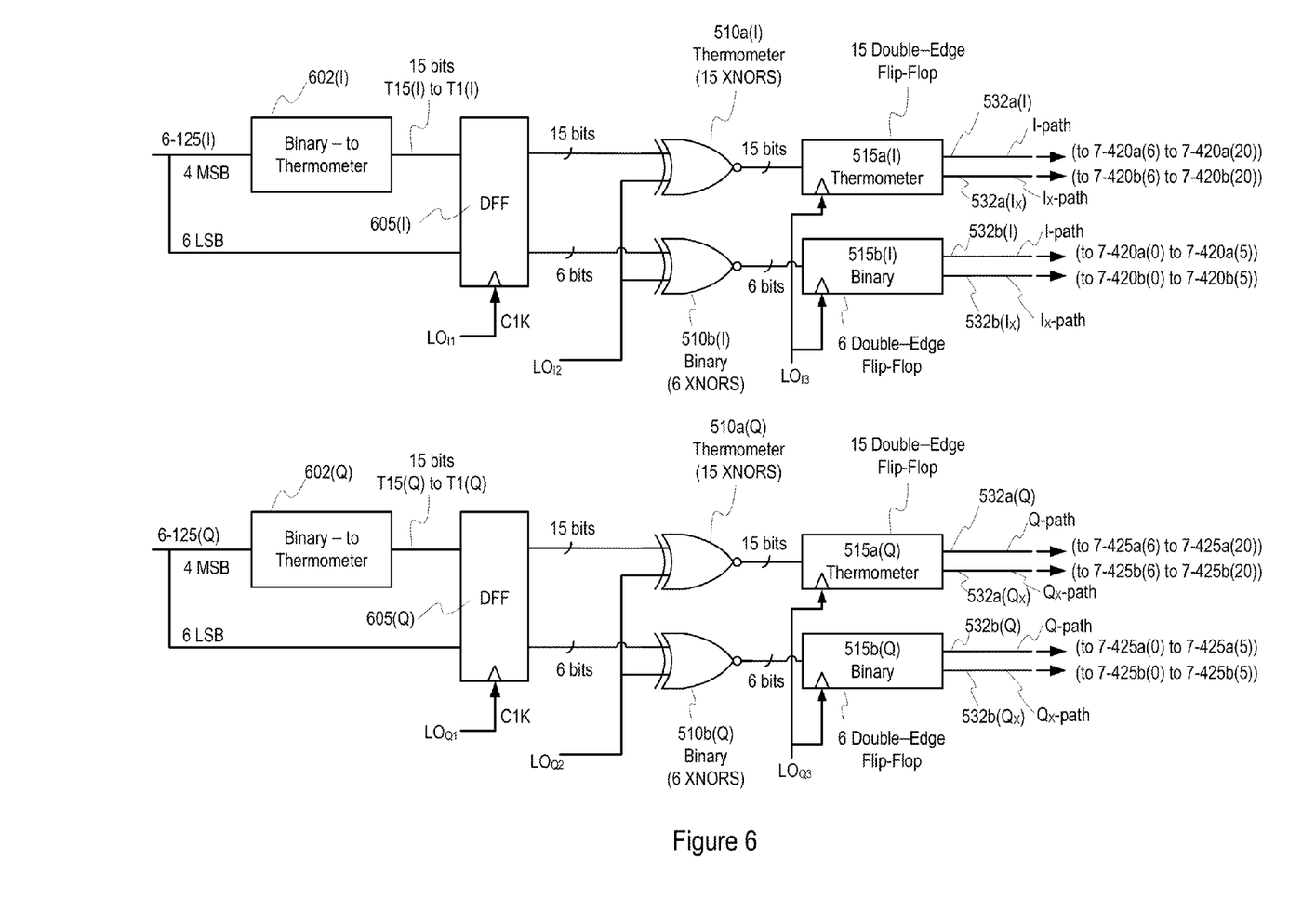
FIG. 6 is a block diagram that shows another example with additional details of the digital modulator, synchronization block, and DAC, in accordance with an embodiment of the disclosure.

FIG. 6 is a block diagram that shows additional details of the digital modulator 1-130, and synchronization block 1-170 in accordance with another embodiment of the disclosure. In this example, the MSB bits of BB I-data and BB-Q-data are converted from binary bits to thermometer bits. For example, bits <9>, <8>, <7> and <6> are converted to 15 thermometer bits. This would reduce the effect of mismatch between different unit current sources implemented inside each DAC current source (4-230*a* and 4-230*b*). These unit current sources will be described in connection with FIGS. 7 and 8. Instead of each XNOR gates (410) and each double-edge flip-flop (415) in FIG. 4, two sets of XNOR gates 510*a* (e.g., thermometer) and 510*b* (e.g., binary) and two sets of double-edge flip-flop 515*a* (thermometer) and 515*b* (binary) are used. Here for example six XNOR gates and six double-edge flip-flops are used for binary blocks. In this example, approximately fifteen (15) XNOR gates and approximately fifteen (15) double-edge flip-flops are used for thermometer blocks.

Figure 7:
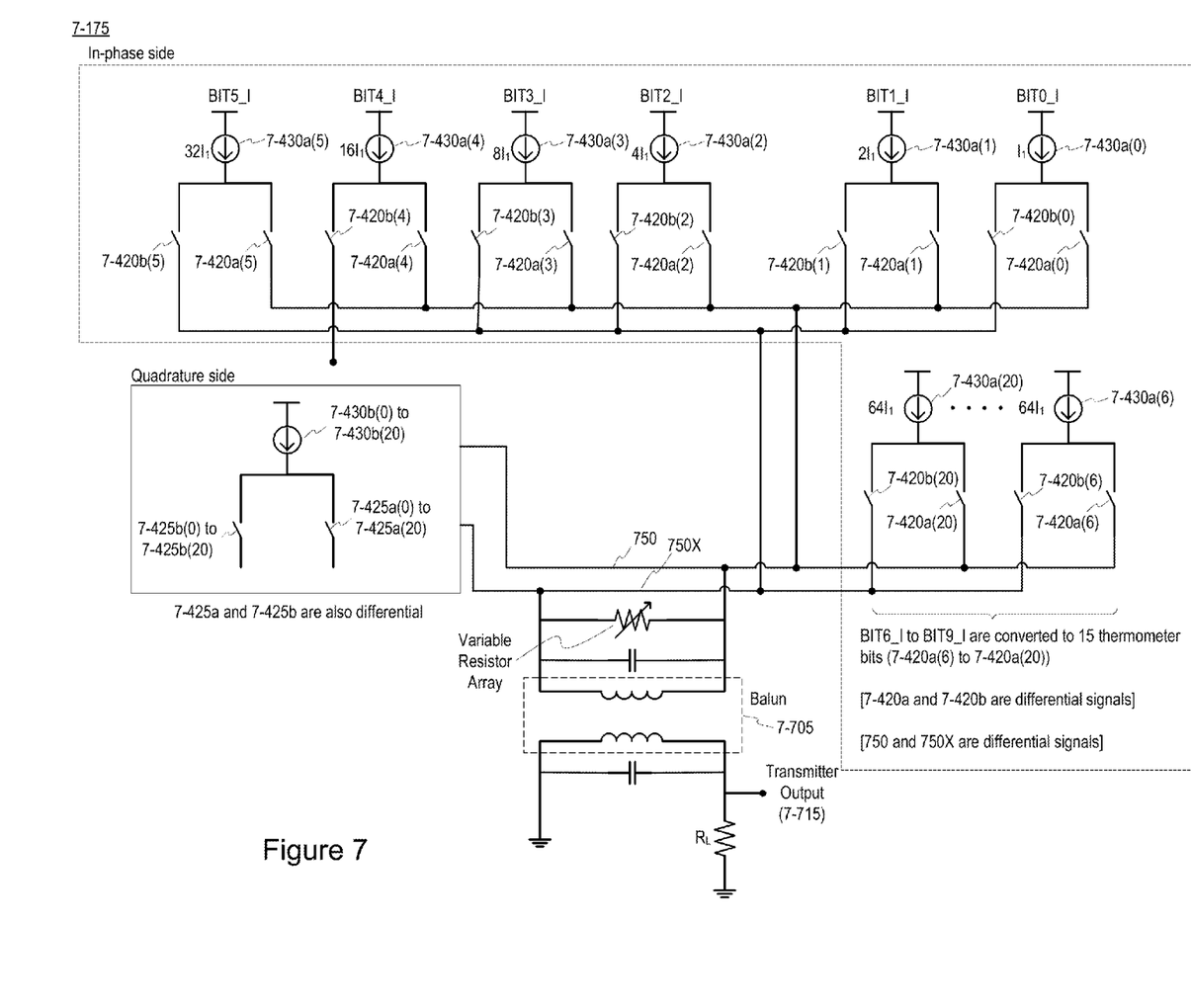
FIG. 7 is a block diagram of a first embodiment of a DAC in accordance with the disclosure.

FIG. 7 is a block diagram of a first embodiment of the DAC 1-175 in accordance with the disclosure. The output of the digital modulator 1-130 (after synchronization by the synchronizer block 1-170) (FIG. 1) controls the switching functions in the DAC 7-175. For example, if the digital modulator 1-130 has an output of 21 bits, including 6-LSB binary bits (e.g. 7-420(5) to 7-420(0)) and 15-MSB thermometer bits (e.g. 7-420(20) to 7-420(6)), these bits will control the DAC switches (e.g. 7-420(20) to 7-420(0)), respectively.

The number of bits in the output modulated signal 1-172 (FIG. 1) from the digital modulator 1-130 may vary. Increasing the bits in the output modulated signal 1-172 from digital modulator 1-130 results in a decrease in quantization noise based on at least the following reason. More bits in the digital signal allows more fine samples of the quantized bit and results in less noise when the more fine samples are converted to analog signal.

The DAC 7-175 provides the DC current sources to be binary weighted for LSB bits and thermometer weighted for MSB bits to convert the digital modulated signal to a current. For example, as shown in FIG. 6, four MSB binary bits (bit9 to bit6) of 6-225(I) are converted to 15 thermometer bits (T 15(I) to T 1(I)), as shown in table below. These thermometer bits are delayed by DFF 605(I) and modulated by XNOR gate 510(I) (thermometer) and will be synchronized by double-edge flip-flop 515(I) (thermometer). Then the 15 thermometer bits are used to control the switches 7-420(20) to 7-420(6). Similarly, four MSB binary bits (bit9 to bit6) of switch 7-425(Q) are converted to 15 thermometer bits (T 15(Q) to T 1(Q)), as shown in table below. These thermometer bits delayed by DFF 605(Q) and modulated by XNOR gate 510(Q) (thermometer) and will be synchronized by double-edge flip-flop 515(Q) (thermometer). Then the 15 thermometer bits are used to control the switches 7-425(20) to 7-425(6). As can be seen from table 2, when the MSB binary bits increase by one, the number of 1's in the thermometer bits increases by one. This reduces the effect of mismatch.

For example, consider the case when the MSB binary bits (Bit9 to Bit6) changes from 0111 to 1000. If these bits, after modulating with XNOR gate 510 and synchronized with double-edge flip-flop 515, are used to control some MSB binary current sources (512*I1, 256*I1, 128*I1, 64*I1), then during this transition three current sources 256*I1, 128*I1, 64*I1 (that were ON) are turned OFF and the current source 512*I1 is turned ON. If the values of these four current sources do not match very well, the total current value would not change by the difference between the two current values 512*I1 and (256*I1+128*I1+64*I1), which is 64*I1. However, by using the thermometer bits instead of the MSB bits, the number of 1's in the thermometer bits changes from 7 to 8. Since each of these thermometers bits is used to control a current source having the same current values as shown in FIG. 7 (e.g., 64*I1), the total current value changes by the difference between the two current values 8*(64*I1) and 7*(64*I1), which is 64*I1, which is significantly more accurate. This is because all thermometer current sources have the same current value (e.g., 64*I1).

Additionally, the quadrature side shown in FIG. 7 includes the same configuration as the in-phase side. The differential outputs of the quadrature side and in-phase side are connected to each other through the signal lines 750 and 750x and to the balun transformer 7-705.

Figure 8:
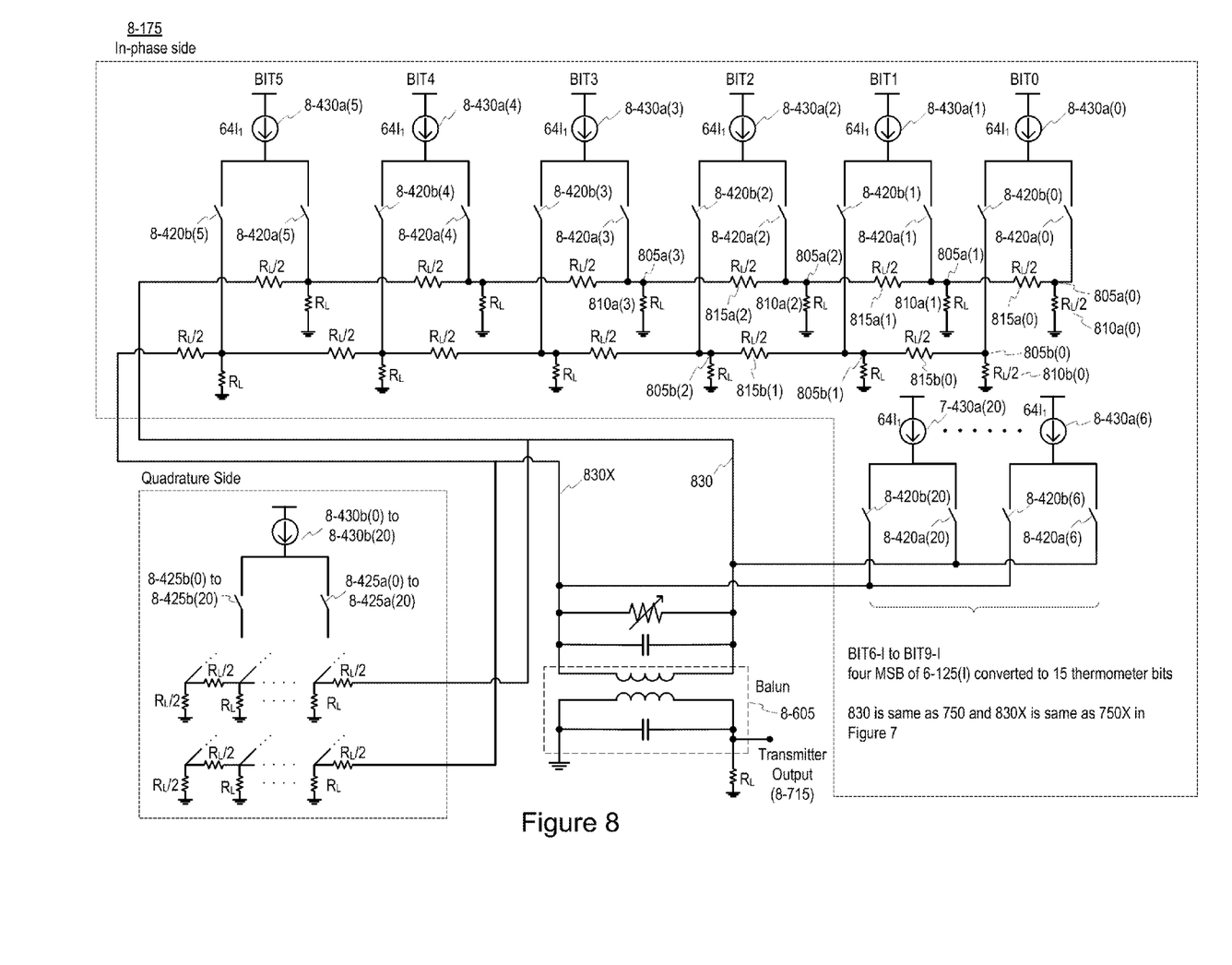
FIG. 8 is a block diagram of a second embodiment of a DAC in accordance with the disclosure.

The following switches will control the flow of the inverted values of the Bits 0 to 20 in the differential side of the in-phase DAC 7-175: in response to the Bit0 value and inverted Bit 0 value, the switch 7-420a(0) and 7-420b(0) control the current (I1) from the current source 7-430a(0), respectively; in response to the Bit 1 value and inverted Bit 1 value, the switch 7-420a(1) and 7-420b(1) control the current (2*I1) from the current source 7-430a(1), respectively; in response to the Bit 2 value and inverted Bit 2 value, the switch 7-420a(2) and 7-420b(2) control the current (4*I1) from the current source 7-430a(2), respectively; and in response to other inverted bit values, the remainder of the switches control corresponding current sources in a similar manner. a FIG. 8 is a block diagram of a second embodiment of the DAC 1-175 in accordance with the disclosure. If the DAC

TABLE 2

| Binary Bits (4 MSB) | | | | Thermometer bits | | | | | | | | | | | | | | | |
|---|---|---|---|---|---|---|---|---|---|---|---|---|---|---|---|---|---|---|---|
| Bit 9 | Bit 8 | Bit 7 | Bit 6 | T 15 | T 14 | T 13 | T 12 | T 11 | T 10 | T 9 | T 8 | T 7 | T 6 | T 5 | T 4 | T 3 | T 2 | T 1 |
| 0000 | | | | 0 | 0 | 0 | 0 | 0 | 0 | 0 | 0 | 0 | 0 | 0 | 0 | 0 | 0 | 0 |
| 0001 | | | | 0 | 0 | 0 | 0 | 0 | 0 | 0 | 0 | 0 | 0 | 0 | 0 | 0 | 0 | 1 |
| 0010 | | | | 0 | 0 | 0 | 0 | 0 | 0 | 0 | 0 | 0 | 0 | 0 | 0 | 0 | 1 | 1 |
| 0011 | | | | 0 | 0 | 0 | 0 | 0 | 0 | 0 | 0 | 0 | 0 | 0 | 1 | 1 | 1 |
| 0100 | | | | 0 | 0 | 0 | 0 | 0 | 0 | 0 | 0 | 0 | 0 | 1 | 1 | 1 | 1 |
| 0101 | | | | 0 | 0 | 0 | 0 | 0 | 0 | 0 | 0 | 0 | 1 | 1 | 1 | 1 | 1 |
| 0110 | | | | 0 | 0 | 0 | 0 | 0 | 0 | 0 | 0 | 1 | 1 | 1 | 1 | 1 | 1 |
| 0111 | | | | 0 | 0 | 0 | 0 | 0 | 0 | 0 | 1 | 1 | 1 | 1 | 1 | 1 | 1 |
| 1000 | | | | 0 | 0 | 0 | 0 | 0 | 0 | 1 | 1 | 1 | 1 | 1 | 1 | 1 | 1 |
| 1001 | | | | 0 | 0 | 0 | 0 | 0 | 1 | 1 | 1 | 1 | 1 | 1 | 1 | 1 | 1 |
| 1010 | | | | 0 | 0 | 0 | 0 | 1 | 1 | 1 | 1 | 1 | 1 | 1 | 1 | 1 | 1 |
| 1011 | | | | 0 | 0 | 0 | 1 | 1 | 1 | 1 | 1 | 1 | 1 | 1 | 1 | 1 | 1 |
| 1100 | | | | 0 | 0 | 0 | 1 | 1 | 1 | 1 | 1 | 1 | 1 | 1 | 1 | 1 | 1 | 1 |
| 1101 | | | | 0 | 0 | 1 | 1 | 1 | 1 | 1 | 1 | 1 | 1 | 1 | 1 | 1 | 1 | 1 |
| 1110 | | | | 0 | 1 | 1 | 1 | 1 | 1 | 1 | 1 | 1 | 1 | 1 | 1 | 1 | 1 | 1 |
| 1111 | | | | 1 | 1 | 1 | 1 | 1 | 1 | 1 | 1 | 1 | 1 | 1 | 1 | 1 | 1 | 1 |

The Balun transformer 7-705 has a differential input and a differential output, and where first output side 7-715 has an output resistor RL connected between the transformer 7-705 and ground, and where the second output side 720 is connected to ground. In an embodiment, the output resistor RL acts as an input impedance of the power amplifier PA 182 (FIG. 1).

The LSB Bits 0, 1, 2, 3, 4, and 5 control the flow of currents values I1, 2*I1, 4*I1, 8*I1, 16*I1, and 32*I1, respectively. The MSB Bits 6, 7, 8, 9 of 6-225(I) are converted to 15 thermometer bits (T 15(I) to T 1(I)) are delayed by DFF 605(I) and modulated by XNOR gate 510a(I) (thermometer) and then are synchronized by double-edge flip-flop 515a(I) (thermometer). Then these 15 thermometer bits control the switches 7-420(20) to 7-420(6) to adjust the flow of current to the output, according to Table 2. If all these bits are zero, the MSB current is zero. If 4 MSB (Bit9, Bit8, Bit7 and Bit6) are equal to 0, 0, 0, 1 respectively, the MSB current is 1*64*I1. If 4 MSB are equal to 0, 0, 1, 0 respectively, the MSB current is 2*64*I1. To have the maximum MSB current (15*64*I1), all 4 MSB bits should be logic "1" (e.g. 1, 1, 1, 1). Therefore, the DC current sources are binary weighted (e.g. I1, 2*I1, 4*I1, 8*I1, 16*I1, and 32*I1) for LSB bits and thermometer weighted (zero, 1*64*I1, 2*64*I1, 3*64*I1, to 15*64*I1) for MSB bits. Here all MSB current cells (7-430a(6) to 7-430a(20) are equal to 64*I1). As a result, the DAC 7-175 converts the digital modulated signal to a current.

8-175 has an input of 21 bits (6 LSB bits and 15 thermometer bits), the DAC 8-175 includes a R-2R (resistor-to-resistor) ladder 805 (or resistor ladder) connected to the current sources 8-430a(0), 8-430a(1), through 8-430a(20) having the same current value (e.g., 64*I1). In this case, LSB Bits 0, 1, 2, 3, 4, and 5 control the differential switches 8-420(0), 8-420(1), 8-420(2), 8-420(3), 8-420(4), and 8-420(5), respectively. When four MSB binary bits (Bits 6 through 9) are converted to 15 thermometer bits, the DAC 8-175 has electrical connections shown in FIG. 8, which is similar to the thermometer weighted connections shown in FIG. 7. These 15 thermometer bits control the differential switches 8-420(6), 8-420(7), through 8-420(20).

The switch 8-420a(0) is connected between the current source 8-430a(0) and a node 805a(0). The switch 8-420b(0), in differential side, is connected between the same current source 8-430a(0) and a node 805b(0). Some resistors (e.g., resistor 810a(0), 815a(0), 815a(1), 815a(2), and the like) in the R-2R has a value of, for example, RL/2, where RL is any resistor value that is set to achieve a voltage drop. Some other resistors (e.g., resistor 810a(1), 810a(2), 810a(3), and the like) in the R-2R has a value of, for example, RL. The resistor 810a(0) is connected between the node 805a(0) and ground. The resistor 815a(0) is connected between the node 805a(0) and a node 805a(1).

The switch 8-420a(1) is connected between the current source 8-430a(1) and the node 805a(1). The switch 8-420b (1), in differential side, is connected between the same current source 8-430*a*(1) and a node 805*b*(1). The resistor 810*a*(1) is connected between the node 805*a*(1) and ground. The resistor 815*a*(1) is connected between the node 805*a*(1) and the node 805*a*(2).

As also shown in FIG. 8, the switch 8-420*a*(2) is connected between the current source 8-430*a*(2) and the node 805*a*(2). The switch 8-420*b*(2), in differential side, is connected between the same current source 8-430*a*(2) and a node 805*b*(2). The resistor 810*a*(2) is connected between the node 805*a*(2) and ground. The resistor 815*a*(2) is connected between the node 805*a*(2) and the node 805*a*(3). Other resistors and current sources in the R-2R ladder 805 are similarly connected as described above and as shown in FIG. 8. However, for current sources 8-430*a*(6) through 8-430*a*(20), the switches 8-420(6) through 8-420(20) are connected so that the thermometer weighted connection of converting the four MSB binary bits (Bit 6 through Bit 9) to 15 thermometer bits is achieved. The resistors connection in the R-2R ladder 805 determines the flow distribution of the current value 64*I1 in response to one of the LSB binary Bits 0 through 5. The current flow to differential output nodes (830 and 830*x*) depends on the resistor ladder for LSB bits. For example only half of current of 8-430*a*(5) ((½)*64*I1=32*I1) and only a quarter of current of 8-430*a*(4) ((¼)*64*I1=16*I1) will pass to the output. Therefore the current flow to output nodes will be 32*I1, 16*I1, 8*I1, 4*I1, 2*I1, 1*I1, if one of Bit5, Bit4, Bit3, Bit2, Bit1 and Bit0 are equal to logic "1", respectively. The current cells (8-430*a*(6) to 8-430*a*(20)) with equal current value (e.g. 64*I1) that controlled by each thermometer bits are simply added to the output of resistor ladder. Each thermometer bits controls the flow of 64*I1 current. A current flowing through an output resistor RL connected to the transformer 8-605 is adjusted according to 6 LSB binary bits (e.g. 6 bits) and MSB thermometer bits (e.g. 15 bits). Additionally the quadrature side, in FIG. 8, includes similar current sources, switches and resistor ladder to those of the in-phase side. The differential outputs of the quadrature side and in-phase side are connected to each other through signal lines 830 and 830*x* and to the balun transformer 8-605.

Additionally, the differential side (of in-phase DAC) 810 of the ladder 805 will have the similar current sources and resistors connections as described above for the non-differential side 830. The differential side is controlled by 6 LSB binary bits 8-420*b*(0) to 8-420*b*(5) (the inverse of (8-420*a*(0) to 8-420*a*(5)) and 15 MSB thermometer bits 8-420*b*(6) to 8-420*b*(20) (the inverse of (8-420*a*(6) to 8-420*a*(20)). In quadrature side, 6 LSB binary bits 8-425*a*(0) to 8-425*a*(5), and the inverse of these bits (8-425*b*(0) to 8-425*b*(5)) and 15 MSB thermometer bits 8-425*a*(6) to 8-425*a*(20), and the inverse of them (8-425*b*(6) to 8-425*b*(20)) control the flow of equal current source 8-430*b*(0) to 8-430*b*(20) (e.g. each equal to 64*I1) with the help of another resistor ladder.

As described above, the second embodiment shown in FIG. 8 includes current sources generating the same current value (e.g., 64*I1) and RF switches having the same size. Thus, a matching for the current sources can be improved.

Duplex spacing is a frequency offset between the frequency of a transmitter and the frequency of a receiver, where both transmitter and receiver are located on same device. To meet the required noise level (generated by the transmitter) at duplex spacing for SAW-less transceivers for FDD receivers, a 12 bit input to the DAC 1-175 (FIG. 1) from the modulator 1-130 is used. The term SAW-less means a filter that heavily attenuates the transmitter noise, is not used in at the transmitter output. As an example, to achieve approximately −158 dBc/Hz or more in the required noise level from a transmitter at duplex-spacing with a 6 dB margin (for an approximately 9 dB Peak-to-Average of RF modulated signal), a 12-bit DAC 1-175 (FIG. 1) is used on the transmitter 100. If, for example, an additional noise reduction method is used in an embodiment of the transceiver 100 (FIG. 1), then the number of bits in the DAC 1-175 can be less than 12 bits. In some other applications, lower noise level from the transmitter may be required which can lead to different number of bits for the DAC.

Figure 9:
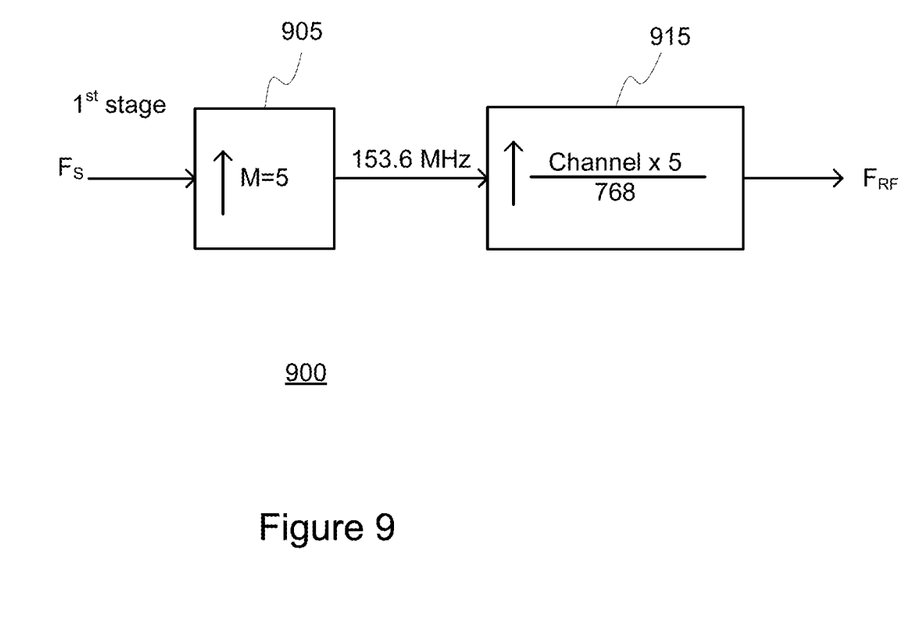
FIG. 9 is an example of a functional block diagram of an interpolation and fractional-rate conversion stage, in accordance with an embodiment of the disclosure.

The digital modulator 1-130 (FIG. 1) requires the data to be sampled at high clock rate (e.g., approximately 1 GHz or 2 GHz). FIG. 9 is an example of the functional block diagram of the digital interpolation/up-sampling block 1-120, which is also a fractional-rate conversion stage 900, in accordance with an embodiment of the disclosure. The digital modulator 1-130 (FIG. 1) requires the data to be sampled at high clock rate $F_{RF}$ (e.g., approximately 1 GHz or 2 GHz). This means the data rate at the output of the block 120 is the same as the frequency $F_{RF}$ of LO-signal (1-165). Different implementations of digital interpolation/up-sampling block (120) can be used to reduce the power consumption of this block. The stage 900 performed by the block 120 (in FIG. 1) converts the input sampling rate Fs (the sampling rate Fs of the output data 122 from the memory 110 in FIG. 1) into the frequency of the Lo-signal 1-165. The stage 900 generates the output at a data rate equal to the required RF frequency value $F_{RF}$, so that the digital modulator 1-130 (in FIG. 1) can perform the digital modulation of the RF signal.

For example, the input sampling frequency Fs can be equal to 30.72 megahertz. This is the data rate when the base-band data is OFDM (orthogonal frequency division multiplexing) signal with the frequency spectrum ranging from approximately zero to 9 megahertz. The first stage 905 performs an up-sample by M (e.g., M=5) in order to have a sampling data (e.g., about 153.6 MHz) that is a multiple of the frequency raster (e.g., 0.2 MHz). The frequency raster is a required increment of desired transmitter frequency ($F_{RF}$) in an embodiment.

The second stage 915 performs a fractional rate conversion. This block 915 converts the fixed input sampling rate (for example 153.6 MHz input) into a range of required transmitter channel frequency $F_{RF}$. Examples of a Channel Frequency $F_{RF}$ (in the (Channel Frequency×5)/768 operation in block 915) range from about 698 MHz to 2570 MHz, by 0.2 MHz increments. For channel frequencies of 698 MHz, 698.2 MHz, . . . 2569.8 MHz, 2570 MHz, the block 915 will convert the 153.6 MHz input (into block 915) into an $F_{RF}$ based on the formula (Channel Frequency×5)/768.

Figure 10:
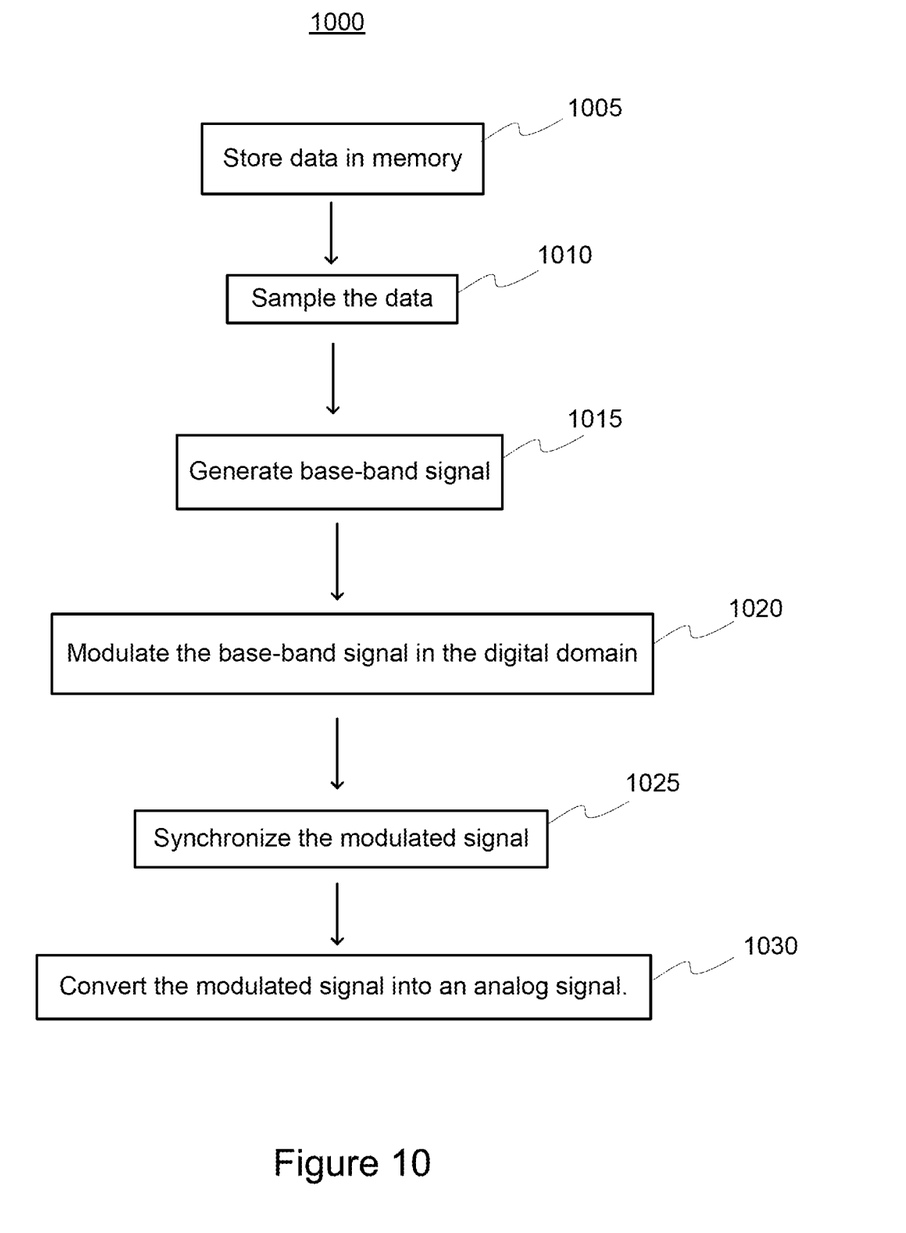
FIG. 10 is a flow diagram of a method of generating a radio transmitter output signal, in accordance with an embodiment of the invention.

FIG. 10 is a flow diagram of a method of generating a radio transmitter output signal, in accordance with an embodiment of the invention. At 1005, data is stored in a memory.

At 1010, the data stored in the memory is sampled.

At 1015, the base-band signal is generated based on the sampling of the data stored in the memory. The base-band signal is typically filtered after sampling the data to suppress images generated during the sampling process.

At 1020, the base-band signal is modulated in a digital domain. Typically, a Voltage Controlled Oscillator (VCO) output voltage is generated, and a local oscillator (LO) signal is generated in response to the VCO output. The modulating of the base-band signal includes digitally modulating the base-band signal with the LO signal.

Before the base-band signal is modulated, the I-data of the baseband signal and a non-delayed LO I-data clock signal that provides timing to the I-data are received, and the Q-data of the baseband signal and a non-delayed LO Q-data clock signal that provides timing to the Q-data are also received.

The modulating of the base-band signal includes: performing an XNOR operation on an I-data (In-phase data) of the base-band signal and a first delayed LO I-data clock; and performing an XNOR operation on a Q-data (Quadrature data) of the base-band signal and a first delayed LO Q-data clock.

At 1025, the modulated signal is synchronized. A delayed clock data is used for the synchronization. For example, during synchronization, the I-data of the modulated signal and a second delayed I-data clock signal that provides timing to the I-data are received, and the Q-data of the modulated signal and a second delayed Q-data clock signal that provides timing to the Q-data are also received.

At 1030, the modulated radio-frequency signal is converted into an analog signal for generating a radio transmission. At 1030, the conversion to the analog signal can include using scaled current sources that are binary weighted for LSB bits and thermometer weighted for MSB bits, or using a resistor to resistor ladder with current sources having a same value for all binary bits.

Other variations and modifications of the above-described embodiments and methods are possible in light of the teaching discussed herein.

It is also within the scope of the disclosure to implement a program or code that can be stored in a machine-readable or computer-readable medium to permit a computer to perform any of the techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the disclosure, including what is described in the Abstract, is not intended to be exhaustive or to limit the invention to the precise forms disclosed. While specific embodiments of, and examples for, the embodiments are described herein for illustrative purposes, various equivalent modifications are possible within the scope of the disclosure, as those skilled in the relevant art will recognize.

These modifications can be made to the embodiments in light of the above detailed description. The terms used in the following claims should not be construed to limit the invention to the specific embodiments disclosed in the specification and the claims. Rather, the scope of the disclosure is to be determined entirely by the following claims, which are to be construed in accordance with established doctrines of claim interpretation.

What is claimed is:

1. A transmitter, comprising:
   a digital modulator configured to modulate a base-band signal in a digital domain into a modulated signal by use of a clock signal and a first delayed version of the clock signal;
   a synchronization module configured to synchronize the modulated signal with a clock signal by use of a second delayed version of the clock signal; and
   an analog output stage configured to convert the modulated signal into an analog signal for transmission,
   wherein the synchronization module comprises:
      a first double edge flip-flop configured to receive the modulated signal and the second delayed version of the clock signal comprising a second delayed I-data clock signal; and
      a second double edge flip-flop configured to receive the modulated signal and the second delayed version of the clock signal comprising a second delayed Q-data clock signal, and
   wherein the first and second double edge flip-flops perform synchronization of the modulated signal based on the second delayed version of the clock signal.

2. The transmitter of claim 1, further comprising:
   a memory configured to store data; and
   a digital interpolation and up-sampling block connected to the memory and to the digital modulator;
   wherein the digital interpolation and up-sampling block performs sampling of the data in the memory and generates the base-band signal based on the sampling, and
   wherein the synchronization module is connected to the digital modulator, and the analog output stage is connected to the synchronization module.

3. The transmitter of claim 2, wherein the digital interpolation and up-sampling block comprises a filter configured to filter the base-band signal.

4. The transmitter of claim 1, further comprising:
   a voltage controlled oscillator (VCO) configured to generate a VCO output voltage; and
   a digital local oscillator (LO) chain coupled to the VCO and configured to generate an LO signal;
   wherein the digital modulator digitally modulates the base-band signal with the LO signal.

5. The transmitter of claim 1, wherein the digital modulator comprises:
   a first XNOR gate configured to perform an XNOR operation on the base-band signal and the first delayed version of the clock signal comprising a first delayed LO I-data clock signal; and
   a second XNOR gate configured to perform an XNOR operation on the base-band signal and the first delayed version of the clock signal comprising a first delayed LO Q-data clock signal;
   wherein the XNOR gates perform modulation of the base-band signal with the first delayed version of the clock signal.

6. The transmitter of claim 1, wherein the digital modulator further comprises:
   a first digital flip-flop configured to receive the base-band signal and the clock signal comprising a non-delayed LO I-data clock signal; and
   a second digital flip-flop configured to receive the base-band signal and the clock signal comprising a non-delayed LO Q-data clock signal;
   wherein the digital flip-flops perform synchronization of the base-band signal based on the clock signal.

7. The transmitter of claim 1, wherein the first delayed version of the clock signal is delayed by a first delay time and wherein the second delayed version of the clock signal is delayed by a second delay time.

8. The transmitter of claim 1, wherein the analog output stage comprises: current sources that are binary weighted for LSB bits and thermometer weighted for MSB bits.

9. The transmitter of claim 1, wherein the analog output stage comprises: a resistor ladder with current sources.

10. A method comprising:
   modulating a base-band signal in a digital domain into a modulated signal by use of a clock signal and a first delayed version of the clock signal;
   synchronizing the modulated signal with the clock signal by use of a second delayed version of the clock signal; and converting the modulated signal into an analog signal for transmission, wherein synchronizing the modulated signal comprises:
receiving the modulated signal and the second delayed version of the clock signal comprising a second delayed I-data clock signal by a first double edge flip-flop; and
receiving the modulated signal and the second delayed version of the clock signal comprising a second delayed Q-data clock signal by a second double edge flip-flop, and wherein synchronization of the modulated signal is performed based on the second delayed version of the clock signal.

11. The method of claim 10, further comprising:
storing data in a memory;
sampling the data in the memory; and
generating the base-band signal based on the sampling,
wherein the sampling and the generating are performed by a digital interpolation and up-sampling block connected to the memory, and
wherein the modulating is performed by a digital modulator, the synchronizing is performed by a synchronization module connected to the digital modulator, and the converting is performed by an analog output stage connected to the synchronization module.

12. The method of claim 11, further comprising:
filtering the base-band signal after sampling the data.

13. The method of claim 10, further comprising:
generating a Voltage Controlled Oscillator (VCO) output voltage; and
generating a local oscillator (LO) signal in response to the VCO output voltage and a VCO frequency;
wherein said modulating of the base-band signal comprises digitally modulating the base-band signal with the LO signal.

14. The method claim 10, wherein said modulating of the base-band signal comprises:
performing an XNOR operation on the base-band signal and the first delayed version of the clock signal comprising a first delayed LO I-data clock signal; and
performing an XNOR operation on the base-band signal and the first delayed version of the clock signal comprising a first delayed LO Q-data clock signal;
wherein the XNOR operations perform modulation of the base-band signal with the first delayed version of the clock signal.

15. The method of claim 10, further comprising:
receiving the base-band signal and the clock signal comprising a non-delayed LO I-data clock signal; and
receiving the base-band signal and the clock signal comprising a non-delayed LO Q-data clock signal;
wherein synchronization of the base-band signal is performed based on the clock signal.

16. The method of claim 10, wherein the first delayed version of the clock signal is delayed by a first delay time and wherein the second delayed version of the clock signal is delayed by a second delay time.

17. The method of claim 10, wherein said converting the modulated signal into the analog signal includes using current sources that are binary weighted for LSB bits and thermometer weighted for MSB bits.

18. The method of claim 10, wherein said converting the modulated signal into the analog signal includes using a resistor ladder.

* * * * *